United States Patent [19]

Waineo

[11] Patent Number: 4,928,811
[45] Date of Patent: May 29, 1990

[54] WALKING BEAM APPARATUS

[76] Inventor: Glenn Waineo, 39001 Schoolcraft Rd., Livonia, Mich. 48150

[21] Appl. No.: 280,953

[22] Filed: Dec. 7, 1988

[51] Int. Cl.$^5$ .............................................. B65G 25/00
[52] U.S. Cl. .................................................... 198/774
[58] Field of Search .......................... 198/774; 414/750

[56] References Cited

U.S. PATENT DOCUMENTS

| | | | |
|---|---|---|---|
| 4,040,514 | 8/1977 | Pielsticker et al. ................. | 198/774 |
| 4,330,262 | 5/1982 | Kranzl et al. .................... | 198/774 X |
| 4,466,792 | 8/1984 | Ballabene et al. ............... | 198/774 X |
| 4,723,909 | 2/1988 | Rouvet ............................. | 198/774 X |

FOREIGN PATENT DOCUMENTS 3627866  3/2988  Fed. Rep. of Germany ...... 198/774

*Primary Examiner*—Robert J. Spar
*Assistant Examiner*—Cheryl L. Gastineau
*Attorney, Agent, or Firm*—Charles W. Chandler

[57] ABSTRACT

A motor is mounted on a base having a pair of horizontal rails on which a series of workpieces are mounted. A lifting frame and a transfer bar are mounted beneath the rails. The lifting frame carries four cam rollers. Four cams mounted on the base support the cam rollers such that as the lifting frame is moved back and forth, it either rises or falls on the base depending upon the frame's direction of motion. A motor is mounted on the base and connected by a linkage to the lifting frame to reciprocate it in a motion parallel to the rails. The transfer bar is mounted, on rollers on the lifting frame to rise and fall with the lifting frame as well as being horizontally moveable with respect to the lifting frame. A second linkage connects the motor to the transfer bar. The transfer bar has structure for engaging the workpiece such that as the motor is rotated, the transfer bar moves in a series of four-sided cycles in which it rises toward the rails to engage and lift the workpieces, then moves parallel to the guide rails to advance the workpiece in a step, then drops to deposit the workpieces on the rails, and then returns to its initial position. This cycle is repeated each time the motor shaft is rotated.

9 Claims, 2 Drawing Sheets

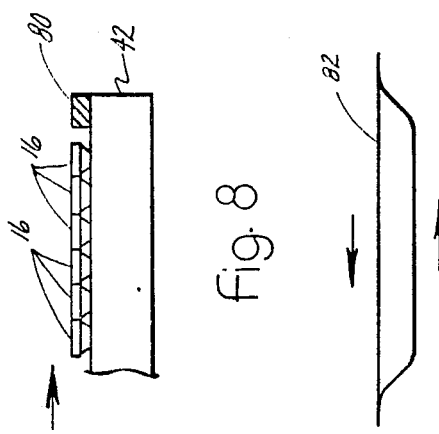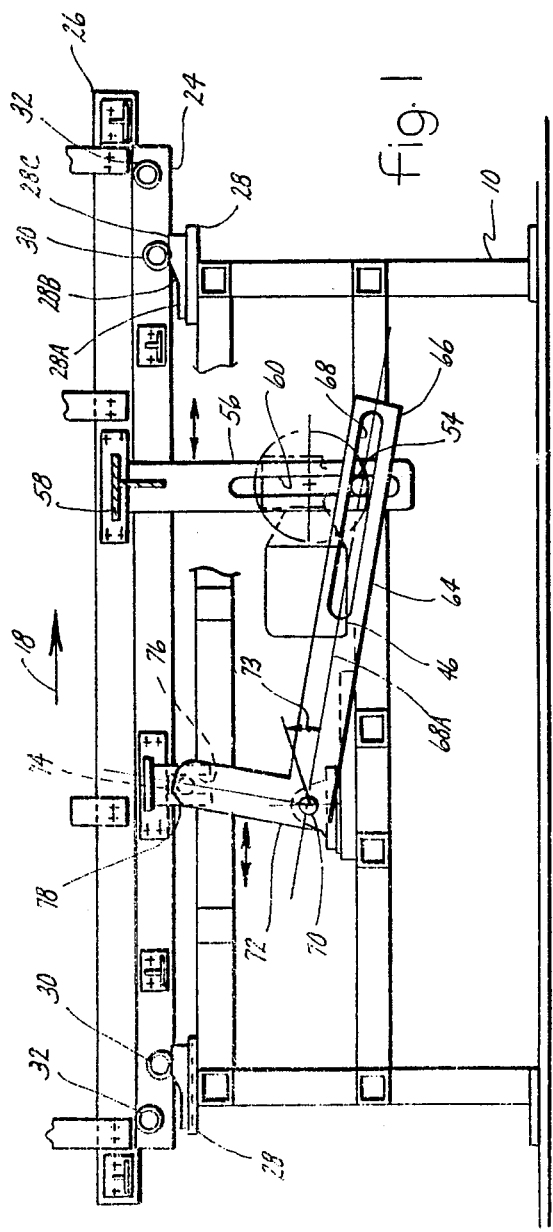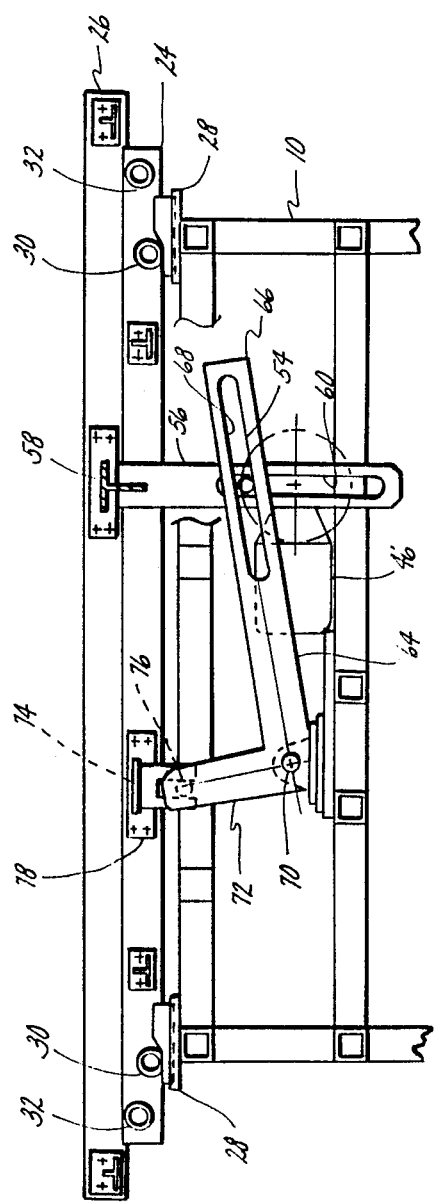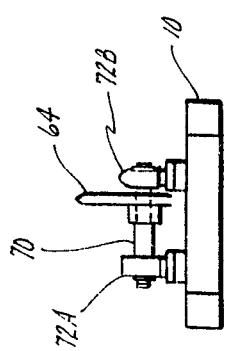

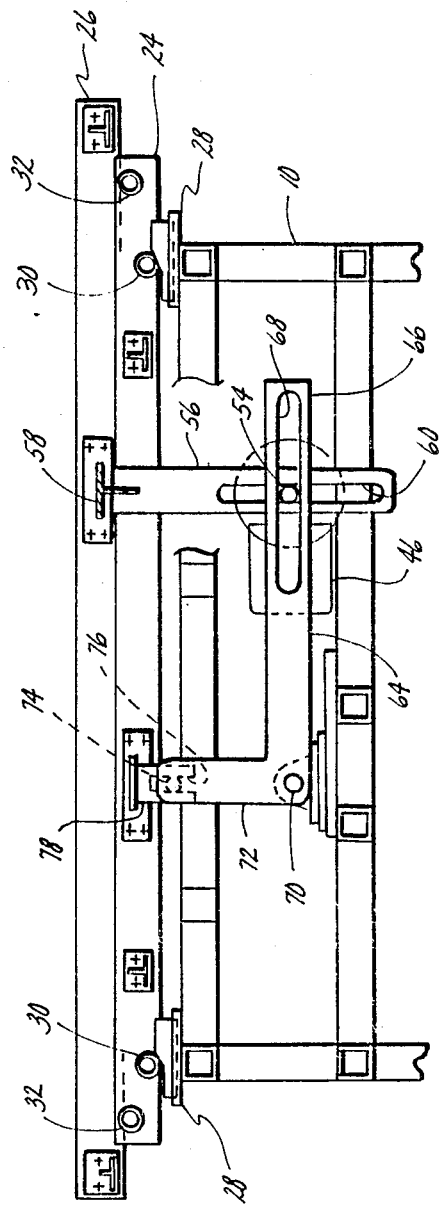
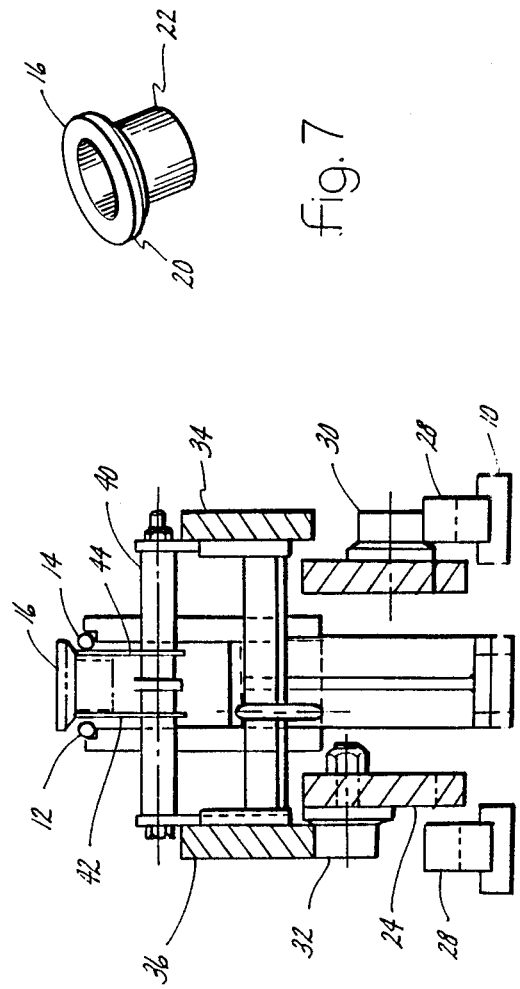
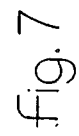
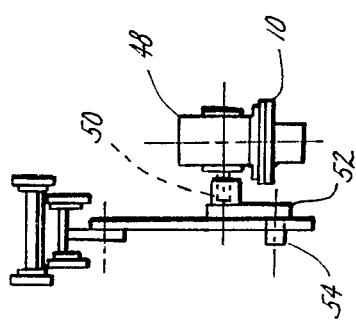

WALKING BEAM APPARATUS

BACKGROUND OF THE INVENTION

This invention is related to a walking beam apparatus, and more particularly to an apparatus in which a lifting bar and a transfer bar are each mechanically connected to a drive motor to step a group of workpieces along a pair of guide rails to an accumulating position.

Certain industrial processes require a workpiece to be stepped along either a linear or a curved path of motion. Usually a group of workpieces are stepped along a guide rail or beam to a position where they are accumulated and available so as to be individually picked up.

SUMMARY OF THE INVENTION

The broad purpose of the present invention is to provide an improved means for progressively stepping a series of workpieces along a guide rail, which may either be straight or curved, as the case may be.

In the preferred embodiment of the invention, the workpieces are mounted on a pair of spaced, parallel rails. A horizontal transfer bar immediately beneath and parallel to the guide rails, has a length accommodating the length of the rails. The transfer bar is cycled in a four-sided path of motion. It is raised from an initial position to engage and raise the group of workpieces, advanced with the workpieces along the guide rails, lowered to deposit the workpieces on the guide rails in an advanced position, and then returned to its initial position. The cycle is repeated to step each workpiece from one end of the rails toward the other end.

The transfer bar is horizontally moveable on a series of rollers on a lifting frame.

The lifting frame is mounted on a base, and has cam followers at each corner. Each cam roller rides on a cam mounted on the base in such manner that as the lifting frame is reciprocated in a horizontal direction, it is alternately raised and lowered on the cams. The cams thus define the lifting distance, that is, the height the transfer bar is raised, the rate of lift of the lifting frame, and the relative position of the lift-to-transfer position of the transfer bar. The cams can be either relocated or exchanged to provide the transfer bar with several degrees of adjustment.

A motor mounted on the base, has a crank connected to a pair of linkages, one of which is connected to the lifting frame and the other connected to the transfer bar to move them in a synchronized motion to step the workpiece along the guide rails.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which:

FIG. 1 is a sectional view of a preferred walking beam apparatus showing the two linkages in a first position;

FIG. 2 is a view similar to FIG. 1, but showing the two linkages in a second position;

FIG. 3 is a view of the pivot means for supporting the drive link;

FIG. 4 is a view similar to FIG. 3, but showing the linkages in still a third position;

FIG. 5 is a view showing the relationship between the transfer bar and the lifting frame linkages;

FIG. 6 is an enlarged transverse view of the lifting frame and the transfer bar;

FIG. 7 illustrates an individual workpiece having a shape chosen for illustrative purposes;

FIG. 8 illustrates the workpieces approaching a stop on the end of the guide rails; and FIG. 9 illustrates a typical transfer bar motion profile.

DESCRIPTION OF THE PREFERRED EMBODIMENT

Referring to the drawings, a preferred walking beam apparatus includes an elongated four-sided base 10. As best seen in FIGS. 1 and 6, the base supports a pair of spaced horizontal guide rails 12 and 14 which, for illustrative purposes, are linear, but could be curved to any other suitable shape for supporting a workpiece 16 being stepped along a horizontal path of motion, generally indicated in the direction of arrow 18. The workpiece is usually stepped along in groups of identically-shaped elements so as to be accumulated for pick-up at the right or downstream end of the base.

The guide rails may be inclined, instead of horizontal. Workpiece 16 may take any other suitable shape, but for illustrative purposes, has the shape illustrated in FIG. 7. The workpiece has an enlarged head 20 having a diameter greater than the distance between guide rails 12 and 14 so that the head can be supported by the guide rails.

A cylindrical body 22 is carried by the head. The diameter of body 22 is less than the distance between rails 12 and 14.

A lifting frame 24 is mounted on the base, and a transfer bar 26 is mounted on the lifting frame. A plurality of cam members 28 are mounted on the base to support the lifting frame. The cam members are identical to one another. The lifting frame carries a rotatable cam follower 30 for each of the cam members.

Referring to FIG. 1, each cam member has a lower horizontal section 28A, an inclined ramp 28B, and an upper horizontal section 28C. Sections 28A and 28C are parallel to the path of motion 18. Each cam roller rides on its cam member, so that the lifting frame is either raised or lowered as the cam roller moves along the ramp depending, upon the cam roller's direction of motion. The height of the ramp, which defines the distance between cam sections 28A and 28C, determines the lifting distance of the lifting frame. The longitudinal position of the cam member relative to the cam roller determines the transfer bar position profile.

FIG. 1 shows the lifting frame in its raised position in which each cam roller is on cam section 28C. FIG. 4 shows the lifting frame in an intermediate position with each cam roller on cam ramp 28B. FIG. 2 shows the lifting frame in its lower position with each cam roller 30 on lower cam section 28A.

Referring to FIG. 6, the lifting frame also has a plurality of cam roller means 32. The transfer bar has horizontal structure 34 and 36 which rides on cam roller means 32 so that the transfer bar is horizontally moveable with respect to the lifting frame, but also rises and falls with the lifting frame.

The transfer bar carries a pair of transverse tie rods 40, only one shown, which support a pair of spaced, parallel elongated transfer elements 42 and 44 which rise and fall with the transfer bar. Transfer elements 42 and 44 are thin such that as the transfer bar is raised, elements 42 and 44 rise on opposite sides of the workpiece body adjacent guide rails 12 and 14 to engage the workpiece head and raise the workpiece.

In order to move both the transfer bar and the lifting frame, a motor 46 is mounted on the base and drivingly connected to gear reducer 48 having output shaft 50. As best illustrated in FIG. 5, a crank 52 is carried on shaft 50. The crank carries a cam follower 54.

Referring to FIG. 1, a vertical arm 56 has its upper end attached to the transfer bar at 58 so as to move with the transfer bar. Arm 56 has a longitudinal slot 60 receiving cam follower 54. As best illustrated in FIGS. 1, 2 and 4, as crank 52 is rotated by the motor in a 360 degree arc of motion, cam follower 54 reciprocates the transfer bar on rollers 32 on the lifting frame, first in the direction of arrow 18 and then in the opposite direction.

Drive member 64 connects lifting frame 24 to cam follower 54. Drive member 64 has an arm 66 with a cam slot 68 receiving cam follower 54. Referring to FIG. 3, drive member 64 has a midsection supported by shaft 70. The ends of shaft 70 are supported by a pair of pillow blocks 72A and 72B so that the axis of rotation of the shaft is aligned with the longitudinal axis 68A of slot 68 so that the drive member is rocked back and forth in an arc 73, see FIG. 1, as cam follower 54 is being rotated by the motor.

The drive member has a second arm 72, at right angles to arm 66, which carries a cam follower 74. Follower 74 rides in a vertical cam slot 76 carried on bracket 78 of the lifting frame. Drive member 64 provides a mechanical connection between the motor and the lifting frame for moving it horizontally so that rollers 30 reciprocate between positions 28A and 28C on cams 28.

The lifting motion of the transfer bar is achieved when the lifting frame is moved towards the right, as viewed in FIG. 1, by riding up ramps 28B to a position on section 28C. As the drive member is rocked in the opposite direction, the lifting frame moves in the opposite direction down ramp 28B to a position on section 28A. The rate of the lifting motion can be varied by replacing the cams with a greater or lesser ramp inclination. Further, the distance the lifting frame is raised and lowered can be adjusted by replacing cam members 28 with cams having a different rise between upper and lower cam sections 28A and 28C. It can be seen that as crank 52 is being rotated, it simultaneously moves both the lifting frame and the transfer bar in a horizontal direction so that they cooperate in moving the two transfer elements 42 and 44 so that they simultaneously raise a group of workpieces, advance them a step in the direction of arrow 18, then lower the workpieces so that they rest on guide rails 12 and 14 as the two elements 42 and 44 continue through their rectangular path of motion, alternately lifting and then lowering the workpieces between each step.

Referring to FIG. 8, a stop 80 is attached to the ends of the two guide rails. The workpieces are stepped toward the stop so as to be accumulated until one or more of the end pieces are picked up by means, not shown. Cams 28 are located such that the transfer bar moves in a profile so as to slightly back up just before the workpieces are deposited on the guide rails. This motion eliminates any back pressure on the end piece. The end piece is not pressed against the stop by the rearward pieces, leaving space for a robot or the like to pick up the end piece without disturbing the neighboring, rearward pieces.

This motion profile 82, as seen in FIG. 9, can be adjusted by properly selecting and locating cams 28. The profile can be chosen so the "back up" motion is at the lower end of the profile so that it has an upside down appearance with respect to profile 82.

Having described my invention, I claim:

1. Apparatus for advancing a workpiece along a stepped path of motion, comprising:
   a base;
   a rail mounted on the base to intermittently support the workpiece as it is being stepped along said path of motion;
   a rotary shaft;
   power means connected to the shaft for rotating same;
   a lifting member mounted on the base for motion therealong, and a first cam member carried by the lifting member;
   a second cam member mounted on the base and engageable with the first cam member;
   one of said cam members having a cam contour engaged with the other of said cam members such that the lifting member is raised with respect to the base in a cammed path that is in accordance with the contour of said one of said cam members, as the lifting member is being moved along the base;
   a transfer bar having means for engaging the workpiece mounted on the rail, and means movably supporting the transfer bar on the lifting member;
   first linkage means connecting the shaft to the lifting member such that it is moved on the second cam member in said cammed path in a first direction and then is raised, and then is moved in the opposite direction and then is lowered, as the shaft is being rotated in an arc of motion;
   said first linkage means comprising:
   a crank carried on the shaft;
   a drive member and means mounting same on the base for a rocking motion;
   first connecting means comprising the drive member having a slot, and a cam follower carried on the crank and received in the drive member slot such that as the crank is being rotated by the shaft in said arc of motion, the drive member is rocked in a first direction and then is rocked in the opposite direction;
   second connecting means connecting the drive member to the transfer bar such that as the drive member is being rocked in said first direction, the transfer bar is moved sequentially from an initial position to engage the workpiece to lift it from the rail and then to advance the workpiece in a step in said first direction along the rail, and then as the drive member is rocked in the opposite direction, the transfer bar lowers the workpiece to deposit it on the rail to complete the step and then returns in the opposite direction to said initial position.

2. Apparatus as defined in claim 1, in which the transfer bar is adapted to repeat said motion to advance the workpiece along said path of motion in a series of steps as the motor continues to rotate the shaft.

3. Apparatus as defined in claim 1, in which the drive member is rocked about a first axis, and the slot has a longitudinal second axis aligned with said first axis.

4. Apparatus for advancing a workpiece along a stepped path of motion, comprising:

a base;

a rail mounted on the base to intermittently support the workpiece as it is being stepped along said path of motion;

a rotary shaft;

power means connected to the shaft for rotating same;

a lifting member mounted on the base for motion therealong, and a first cam member carried by the lifting member;

a second cam member mounted on the base and engageable with the first cam member;

one of said cam members having a cam contour engaged with the other of said cam members such that the lifting member is raised with respect to the base in a cammed path that is in accordance with the contour of said one of said cam member, as the lifting member is being moved along the base;

a transfer bar having means for engaging the workpiece mounted on the rail and means movably supporting the transfer bar on the lifting member;

first linkage means connecting the shaft to the lifting member such that it is moved on the second cam member in said cammed path in a first direction and then is raised, and then is moved in the opposite direction and then is lowered, as the shaft is being rotated in an arc of motion;

said first linkage means comprising:

a crank carried on the shaft;

a drive member and means mounting same on the base for a rocking motion;

first connecting means connecting the drive member to the crank such that as the crank is being rotated by the shaft in said arc of motion, the drive member is rocked in a first direction and then is rocked in the opposite direction;

second connecting means comprising the transfer bar having slot means, and a cam follower on the crank being received in the transfer bar slot means, the second connecting means connecting the drive member to the transfer bar such that as the drive member is being rocked in said first direction, the transfer bar is reciprocated in a back and forth motion in which the transfer bar is moved from an initial position to engage the workpiece to lift it and then to advance it along the rail, and then as the drive member is rocked in the opposite direction, the transfer bar lowers the workpiece to deposit it on the rail to complete said step and then returns to said initial position.

5. An apparatus as defined in claim 4, in which the cam member is replaceable to change said cammed path.

6. Apparatus for advancing a workpiece along a stepped path of motion, comprising:

a base;

a rail mounted son the base to support the workpiece as it is being stepped along said path of motion;

a rotary shaft;

power means connected to the shaft for rotating same;

a transfer bar having means for engaging the workpiece mounted on the rail for raising the workpiece and advancing it along the rail;

a lifting member and a first cam member carried by the lifting member;

a second cam member mounted on the base and engageable with the first cam member;

one of said cam members having a cam contour including an inclined cam ramp, and being engaged with the other of said cam members such that the lifting member is raised with respect to the base in a cammed path that is in accordance with the contour of said one of said cam members;

first linkage means connecting the shaft to the lifting member such that it is moved along the base from an initial position according to said cam contour in a first direction parallel to said rail, and then up the cam ramp and then parallel to the rail, and then in a reverse direction parallel to said rail and then down said cam ramp and then returned toward said initial position as the shaft is being rotated in an arc of motion;

means supporting the transfer bar on the lifting member such that the transfer bar is horizontally moveable with respect to the lifting member, parallel to the rail;

second linkage means connected to said shaft for moving the transfer bar with respect to the lifting member, as the shaft is being rotated, such that the lifting member and the transfer bar cooperate to sequentially lift the workpiece from the rail, advance the workpiece in said first direction along the rail, and then lower the workpiece to a supportive position on the rail as the transfer bar is being moved in the opposite direction, whereby the rotary shaft is operative to drive both the transfer bar and the lifting member as they cooperate in stepping the workpiece along said rail.

7. An apparatus as defined in claim 6, in which the cam member is replaceable to change said cammed path.

8. An apparatus as defined in claim 6, in which the transfer bar advances the workpiece along the rail toward a raised position, and then the transfer bar is lowered toward said initial position but in a reverse direction such that the workpiece is being moved in said reverse direction as it engages the rail.

9. Apparatus for advancing a workpiece along a stepped path of motion comprising:

a base;

a generally horizontal rail mounted on the base to support the workpiece as it is being stepped along said path of motion;

a rotary shaft;

power means connected to the shaft for rotating same;

a transfer bar having means for engaging a workpiece mounted on the rail, for raising the workpiece and advancing it along the rail, the transfer bar having first roller means;

a lifting member, and cam roller means carried by the lifting member, the lifting member having means for supporting the first roller means and the transfer bar such that the transfer bar is vertically moveable with the lifting member, and horizontally moveable with respect to the lifting member;

a cam member mounted on the base for supporting the cam roller means such that the lifting member is horizontally moveable along the base, the cam member having a contour including an inclined ramp, a generally horizontal first cam section connected to the lower end of the ramp, and a generally horizontal second cam section connected to the upper end of the ramp, such that the lifting member is raised with respect to the base in a path that is in accordance with the contour of said cam member;

a crank carried on said shaft to orbit about said shaft;

a cam follower carried on the crank;

a drive member, and means pivotally supporting the drive member on the base for a rocking movement, the drive member having a cam slot receiving the cam follower on the crank such that the drive member is moved in a rocking motion as the shaft is being rotated, first means carried on the drive member and connected to the lifting member to horizontally reciprocate same along the cam member as the drive member is being moved in said rocking motion; and link means carried by the transfer member, said link means having a slot receiving the cam follower on the crank such that the transfer bar is moved in a horizontal first direction and then in the opposite horizontal direction, on the lifting member, as the drive member is being moved in said rocking motion, whereby the transfer bar and the lifting member cooperate to raise the workpiece from the rail to a raised position to a raised position, to advance the workpiece along the rail in said raised position, and then to lower the workpiece to a supportive position on the rail.

* * * * *